United States Patent
Sarangdhar et al.

(10) Patent No.: US 10,019,400 B2
(45) Date of Patent: Jul. 10, 2018

(54) ADDITIONAL SECURED EXECUTION ENVIRONMENT WITH SR-IOV AND XHCI-IOV

(71) Applicant: Intel Corporation, Santa Clara, CA (US)

(72) Inventors: Nitin V. Sarangdhar, Portland, OR (US); Steven B. McGowan, Portland, OR (US); Raul Gutierrez, Folsom, CA (US); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 14/671,465

(22) Filed: Mar. 27, 2015

(65) Prior Publication Data

US 2016/0283425 A1     Sep. 29, 2016

(51) Int. Cl.
| | |
|---|---|
| *G06F 13/42* | (2006.01) |
| *G06F 13/38* | (2006.01) |
| *G06F 13/40* | (2006.01) |
| *G06F 13/12* | (2006.01) |
| *G06F 9/50* | (2006.01) |
| *G06F 13/362* | (2006.01) |

(52) U.S. Cl.
CPC ........ *G06F 13/362* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,478,180 B1 | 1/2009 | Li | |
| 8,327,137 B1 * | 12/2012 | Erb | ........................ G06F 21/53 |
| | | | 713/164 |
| 2009/0031303 A1 | 1/2009 | Frank | |
| 2010/0146620 A1 * | 6/2010 | Simeral | ............... G06F 9/45537 |
| | | | 726/21 |
| 2011/0029695 A1 | 2/2011 | Kishore et al. | |
| 2012/0166690 A1 | 6/2012 | Regula | |
| 2014/0109091 A1 | 4/2014 | Philipson et al. | |

OTHER PUBLICATIONS

PCT International Search Report, PCT Application No. PCT/US2016/017948, dated Jun. 29, 2016, 3 pages.

* cited by examiner

*Primary Examiner* — David E Martinez
(74) *Attorney, Agent, or Firm* — International IP Law Group, P.L.L.C.

(57) ABSTRACT

An apparatus is described herein. The apparatus includes a Universal Serial Bus (USB) component and a controller interface. The controller interface is to allocate register space for interfacing with the USB component and the USB component is virtualized into multiple instantiations. The apparatus also includes a secure environment, and the secure environment further virtualizes the multiple instantiations such that the multiple instantiations are owned by the secure environment.

6 Claims, 7 Drawing Sheets

ADDITIONAL SECURED EXECUTION ENVIRONMENT WITH SR-IOV AND XHCI-IOV

TECHNICAL FIELD

The present technique relates generally to a secure environment for USB devices. More specifically, the present techniques relate to an additional secured execution environment with SR-IOV and xHCI-IOV.

BACKGROUND ART

USB devices may be virtualized using Single Root Input/Output Virtualization (SR-IOV). The virtualization abstracts each USB device connected to a host system via a virtual machine manager (VMM). A VMM may take exclusive ownership of a USB device and assign ownership of a USB device to a virtual machine (VM). However, the virtual machine manager may not always be relied upon to isolate and secure USB devices.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

A trusted execution environment is an isolated environment that enables protection and security of code and devices of a system or platform. The trusted execution environment is independent of the host operating system, and can include both hardware and software components. Trusted execution environments can be processors of a host, such as a dedicated secured environment management engine (ME).

Universal Serial Bus (USB) devices may be security critical devices that are coupled with a host via the trusted execution environment. USB security critical devices are devices that control sensitive data, and may be, for example, a finger print scanner, a keyboard, or a camera. The USB devices are typically controlled by a USB controller coupled through a Peripheral Component Interconnect Express (PCIe) interface to a host platform. The PCIe may be according to any PCI Specification, such as the PCI Express 3.0 Base Specification revision 3.0 released November 2010. In embodiments, the USB controller is an eXtensible Host Controller Interface (xHCI) host controller (e.g., an xHCI controller complaint with the eXtensible Host Controller Interface Specification for Universal Serial Bus 3.0, revision 1.1 published Dec. 20, 2013). The xHCI host controller in turn is managed by a host operating system (OS) driver. The xHCI Specification defines how to share USB devices across multiple virtual machine (VM) instantiations using a combination of the PCIe defined Single Root-Input/Output Virtualization (SR-IOV) mechanism and the xHCI-Input/Output Virtualization (xHCI-IOV) mechanism defined by the xHCI Specification. In embodiments, the combination of SR-IOV and xHCI-IOV may be referred to simply as SR-IOV. SR-IOV operates in conjunction with PCIe and the xHCI to enable Input/Output virtualization of USB devices.

In a virtualization environment, each VM is generally independent of other VMs, and each VM can perform a different function. A secure VM can "own" security critical USB devices, while control of the remaining USB devices is allocated to the VMM or other VMs. As used herein, owning a component may refer to having control of the component such that system resources are provided to the component by the owner. Owing the component can also refer to having complete control of the component. In the standard virtualization case, the xHCI host controller is managed by a virtual machine manager (VMM) driver. The VMM driver enables sharing of the USB devices across multiple VMs.

Embodiments described herein enable an additional secured execution environment with SR-IOV and xHCI-IOV. A secure environment may further virtualize multiple instantiations of VMs spawned by a VMM. The multiple instantiations are further virtualized by emulating a register space for the multiple instantiations. In embodiments, a USB device is virtualized into multiple instantiations according to the xHCI Specification. The xHCI Specification defines how to interface with a USB hub and how a USB hub may be virtualized into multiple instantiations using SR-IOV. According to the present techniques, some USB devices are removed from VMM control and the control of these devices are assigned to a more secure and available environment. USB security critical devices can operate within the more secure, trusted environment when a VMM may not be present, as in some single host OS applications. Even when a VMM is present, security or implementation reasons may prevent the isolation of devices by VMM to a secure VM.

Each VM is to operate on the computing system substantially independently of its peers. For example, each VM may have its own memory space on the physical computing system and may implement its own Operating System (OS) and associated programs. However, the VMs share the physical resources of the computing system. Thus, one physical computer may be used to host multiple VMs, each performing a different function. This ensures that the processors of the physical computer are effectively utilized to service multiple tasks.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Figure 1:
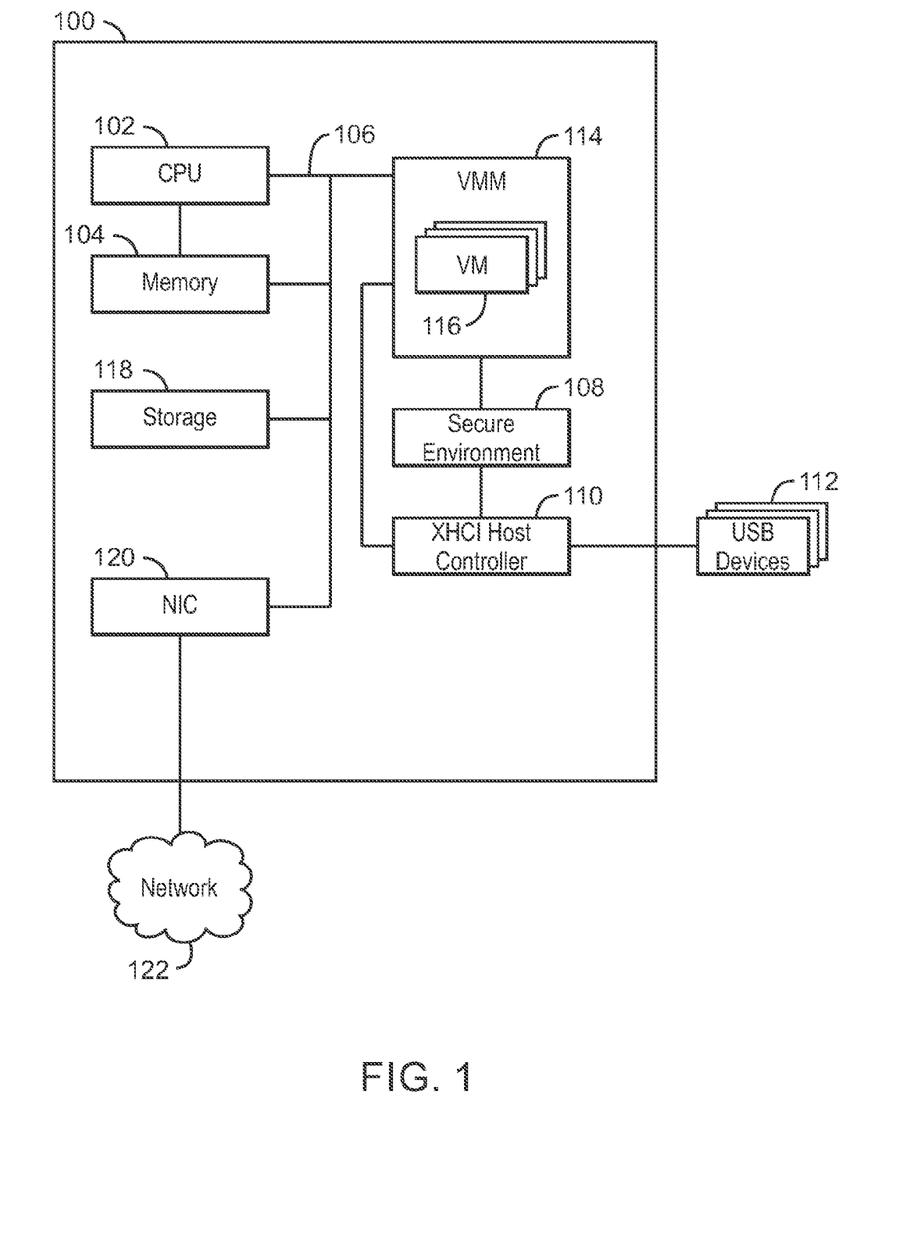
FIG. 1 is a block diagram of a system with a secure environment.

FIG. 1 is a block diagram of a system 100 with a secure environment. The system 100 may be components of, for example, a laptop computer, desktop computer, Ultrabook, tablet computer, mobile device, or server, among others. The system 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the system 100 may include more than one CPU 102. The memory device 104 can include random access memory (RAM), read only memory (ROM), flash memory, or any other suitable memory systems. For example, the memory device 104 may include dynamic random access memory (DRAM).

The CPU 102 may be connected through the bus 106 to a VMM 114. The VMM 114 can in turn delegate specific functions, such as ownership of specific USB devices 112, to a VM 116. The VMM 114 and the VM 116 interface to the USB devices 112 via an xHCI host controller 110. A secure environment 108 is to enable a trusted execution environment for security critical USB devices 112. In embodiments, the secured environment 108 is a management engine (ME). Additionally, the secured environment may be a separate compute environment, complete with its own CPU, memory, and other compute environment functionality. The secured environment 108 is the primary owner of the xHCI host controller 110. The xHCI host controller 110 may be coupled with a number of USB devices 112 and is to provide an interface to the USB devices 112. The USB devices 112 may be, for example, a hub, keyboard, mouse, storage device, finger print sensor etc. The secured environment 108 delegates specific functions, such as ownership of specific USB devices 112, to the VMM 114. The VMM 114 can then delegate specific functions to a particular VM. In this manner, the USB devices are protected through a three level hierarchy of virtualization.

The system 100 may include a storage device 118. The storage device 118 can be a physical memory such as a hard drive, an optical drive, a thumb drive, an array of drives, or any combinations thereof. The storage device 118 may also include remote storage drives. The system 100 may also include a wired or wireless network interface controller (NIC) 120 may be configured to connect the system 100 to a network 120. The network 120 may be a wide area network (WAN), local area network (LAN), or the Internet, among others.

It is to be understood that the block diagram of FIG. 1 is not intended to indicate that the system 100 is to include all of the components shown in FIG. 1. Rather, the system 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate secure communications between components.

In order to enable the virtual machines with SR-IOV, virtual functions (VFs) and physical functions (PF) are implemented. Virtual functions are "lightweight" PCI functions that are linked to a physical function. The physical function can maintain exclusive control of resources, share resources with one or more virtual functions, or assign resources directly to virtual functions. Physical functions are full-featured PCI functions that support the SR-IOV and can be discovered, managed, and manipulated similar to a PCI device. After SR-IOV is enabled in the physical function, the PCI configuration space of each virtual function can be accessed by the bus, device, and function number of the physical function. Moreover, each virtual function has a PCI memory mapped 10 (MMIO) space, which is used to map its register set. The virtual function device drivers operate on its respective register set to enable its functionality and the virtual function appears as an actual PCI device to a VM.

Figure 2A:
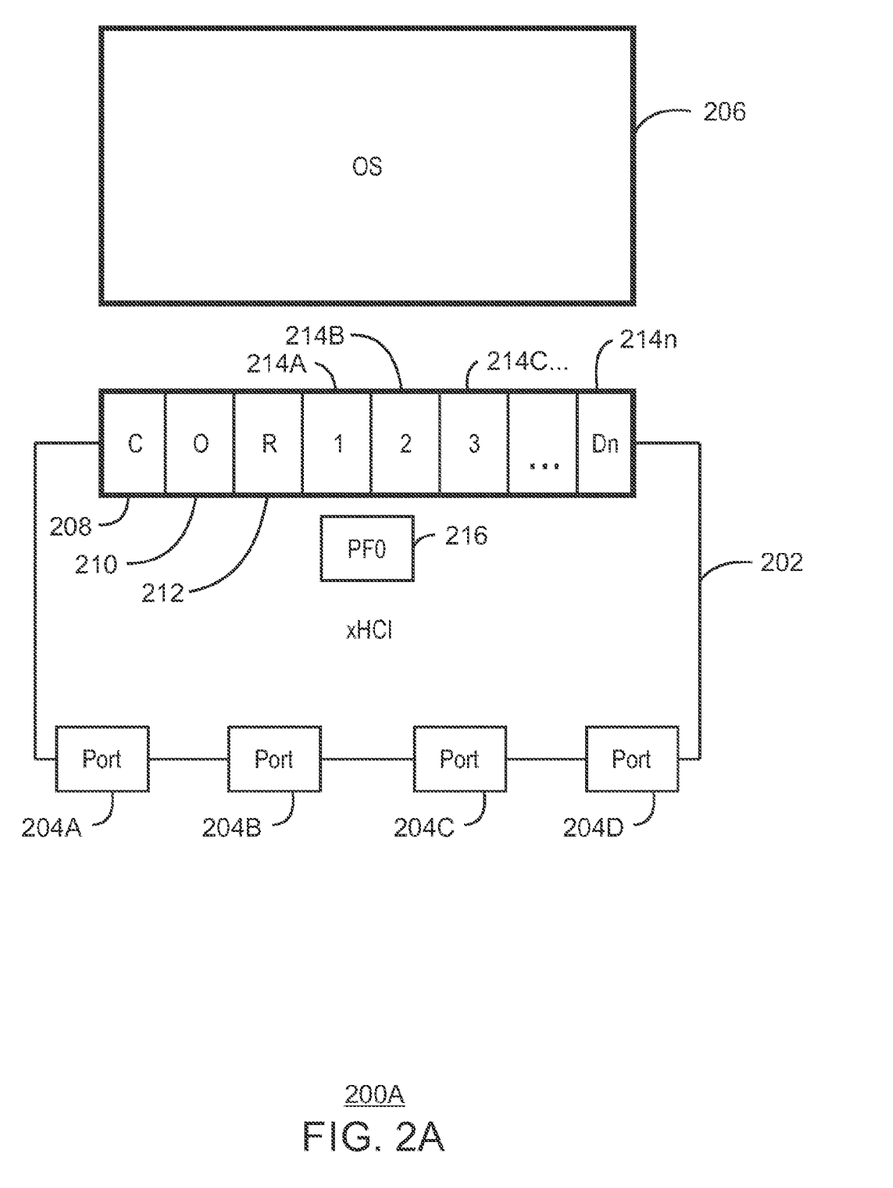
FIG. 2A is a block diagram of a system with a non-virtualized xHCI interface.

FIG. 2A is a block diagram of a system 200A with a non-virtualized xHCI interface. The non-virtualized interface includes an xHCI host controller 202 that is to control USB devices coupled with the system 200A via USB ports 204A, 204B, 204C, and 204D. The xHCI host controller 202 interfaces with a platform as a PCI interface is managed by a host operating system (OS) 206 driver. In embodiments, the xHCI host controller 202 is a basic XHCI controller that supports Low-, Full-, High-, SuperSpeed, and SuperSpeed-Plus USB devices. In accordance with a PCIe interface, the xHCI host controller 202 is addressed as a function and is a single logical entity. In the case of no virtualization, the function is a physical function with a PCIe configuration space. The OS 206 has direct control over the physical function zero (PF0) and no corresponding virtual function exists in the system 200A.

The xHCI host controller 202 has an address space that includes a capability register 208, an operational register 210, and a runtime register 208. The capability register 208 defines the capabilities and limits associated with the xHCI host controller 202. The operational register 210 is configured by the OS 206 to enable various communication with the xHCI controller such as status requests and other controls or commands. The runtime register 212 can be used to process various runtime events, such as interrupts at the xHCI host controller. The PCIe address space also includes a number of doorbell registers 214. In the example of FIG. 200A, doorbell registers 214A, 214B, 214C . . . 214n are illustrated, and referred to generally as doorbell registers 214. One doorbell register is defined for each device slot. Each USB device is associated with a device slot. In embodiments, the OS 206 uses the doorbell registers to notify the xHCI host controller that there are tasks for the xHCI controller to perform. A USB device connected to any of the port 204A, port 204B, port 204C or the port 204D would be associated with a device slot and corresponding doorbell register 214.

With no virtualization, the OS 206 is responsible for isolation and security provided to USB devices connected to any of the port 204A, port 204B, port 204C or the port 204D. Host based malware can easily intercept sensitive data from the USB devices, as no isolation of the USB devices exists. Accordingly, malware can be used to observe sensitive user interactions with the system via a USB mouse, keystrokes that reveal sensitive data via a USB keyboard, and sensitive finger print information via a USB based finger print scanner.

Figure 2B:
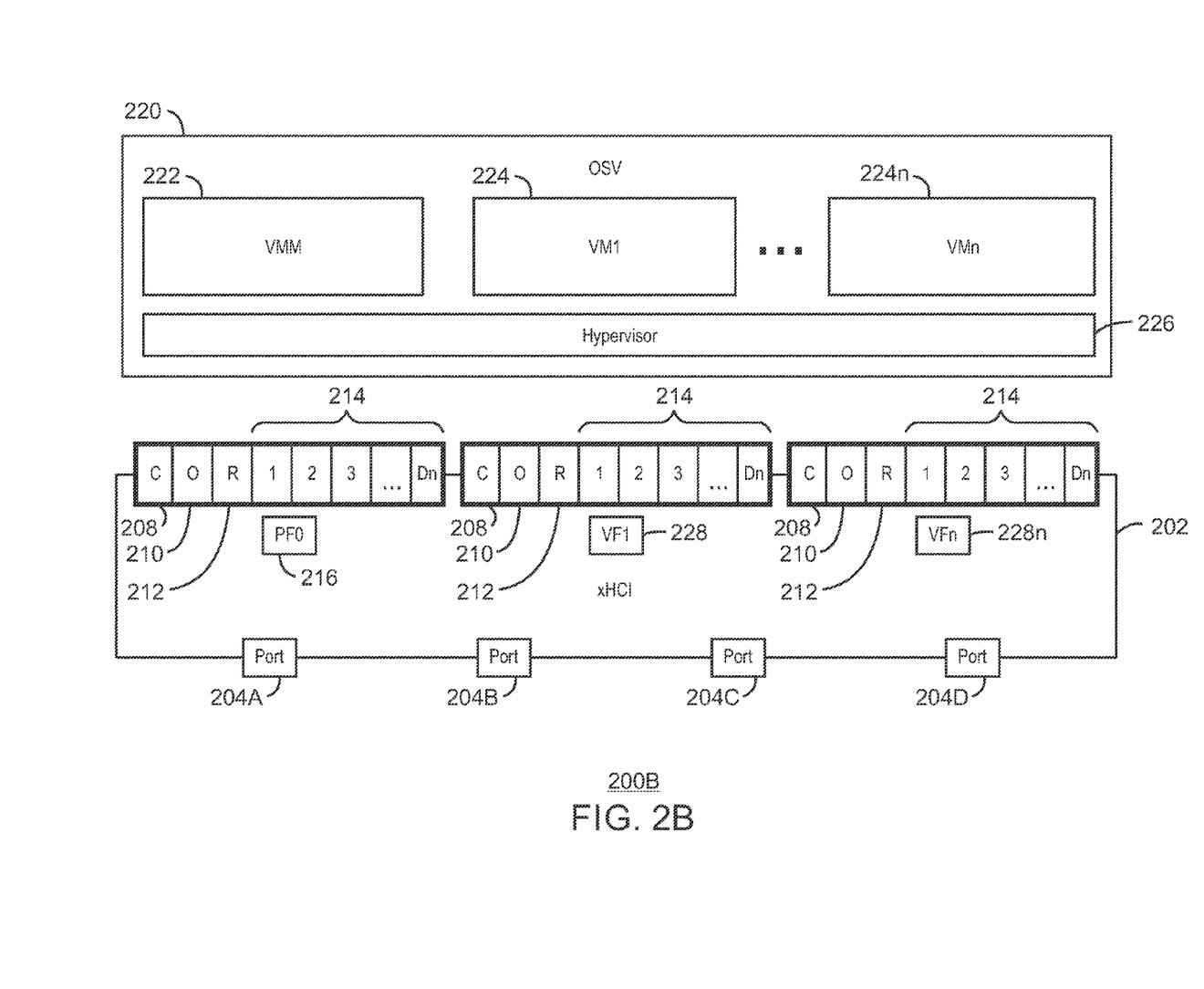
FIG. 2B is a block diagram of a system with a virtualized xHCI interface.

FIG. 2B is a block diagram of a system 200B with a virtualized xHCI interface. Similar to FIG. 2A, FIG. 2B includes an xHCI host controller 202 that is to control USB devices coupled with a system via USB ports 204A, 204B, 204C, and 204D. An operating system vendor (OSV) 220 can create a virtual machine manager (VMM) 222. The virtual machine manager can spawn any number of virtual machine (VM) instantiations illustrated as VM1 224 through VMn 224n, and referred to generally as VMs 224. Communication between the VMM 222 and the VMs 224 is done via a hypervisor 226. The hypervisor 226 is to enable execution of the VMs on system hardware, and also enables communication between the VMM, VMs, and various address spaces.

The VMM 222 owns the physical function zero (PF0) 216. The PF0 216 is used to emulate a number of virtual function (VF) instantiations, each corresponding to a VM. As used herein, emulating a function may refer to generating a virtual function. Emulating may also refer to imitating what is being emulated. Accordingly, emulating a physical function be refer to another function that imitates the physical function. FIG. 2B illustrates virtual function instantiations VF1 228 through VFn 228n, which are referred to generally as VFs 228. Through manipulation and configuration of the emulated address space of each VF, the VMM can grant a VM dedicated ownership or shared ownership of a USB device. In the case where the USB component is a USB hub coupled to a port 204, the USB devices further coupled with the USB hub can be owned by any one of a single VM or shared across multiple VMs.

Using the virtualization illustrated by FIG. 2B, a USB device can be secured and isolated by being owned by a single VM. The USB device can be hidden from other VMs, even when the USB device is coupled with a port via a shared USB hub. However, a VMM may not always be relied upon to isolate and secure USB devices. In some cases, security or implementation reasons may prevent the isolation of devices by a VMM to a secure VM.

Figure 2C:
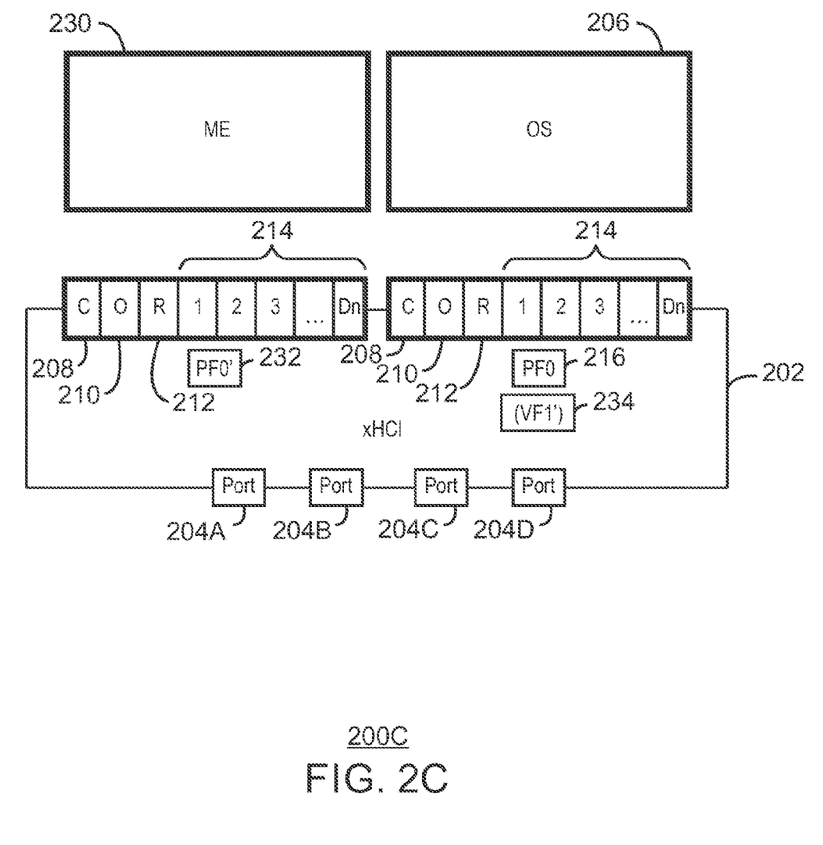
FIG. 2C is a block diagram of a system with a management engine virtualized xHCI interface.

FIG. 2C is a block diagram of a system 200C with a management engine virtualized xHCI interface. FIG. 2C includes the xHCI host controller 202 that is to control USB devices coupled with a system via USB ports 204A, 204B, 204C, and 204D. A management engine (ME) 230 owns a root physical function prime (PF0') 232. In embodiments, the ME is managed by firmware (FW). The PF0' 232 is used to emulate a virtual function prime (VF1') instantiation 234 subject to control by the OS 206. To the OS 206, VF1' 234 is a PF0 216, which the OS driver expects for proper OS 206 control of the xHCI host controller 202. Accordingly, the OS 206 addresses the emulated VF1' 234 as PF0 216.

In embodiments, the ME 230 is a separate compute environment, complete with its own CPU, memory, and other compute environment functionality. Through PF0' control registers, the ME 230 can grant VF1' 234 and the OS 206 dedicated ownership or shared ownership of a USB device coupled via a port 204. The ME 230 can also retain ownership of a USB device coupled via a port 204. In the case where a USB hub is coupled to a port 204, the USB devices further coupled with the USB hub can be owned by either the OS 206 or the ME 230. To create a secure and isolated environment for a USB device, the ME 230 can hide the existence of USB devices at a port 204 from the OS 206.

Figure 2D:
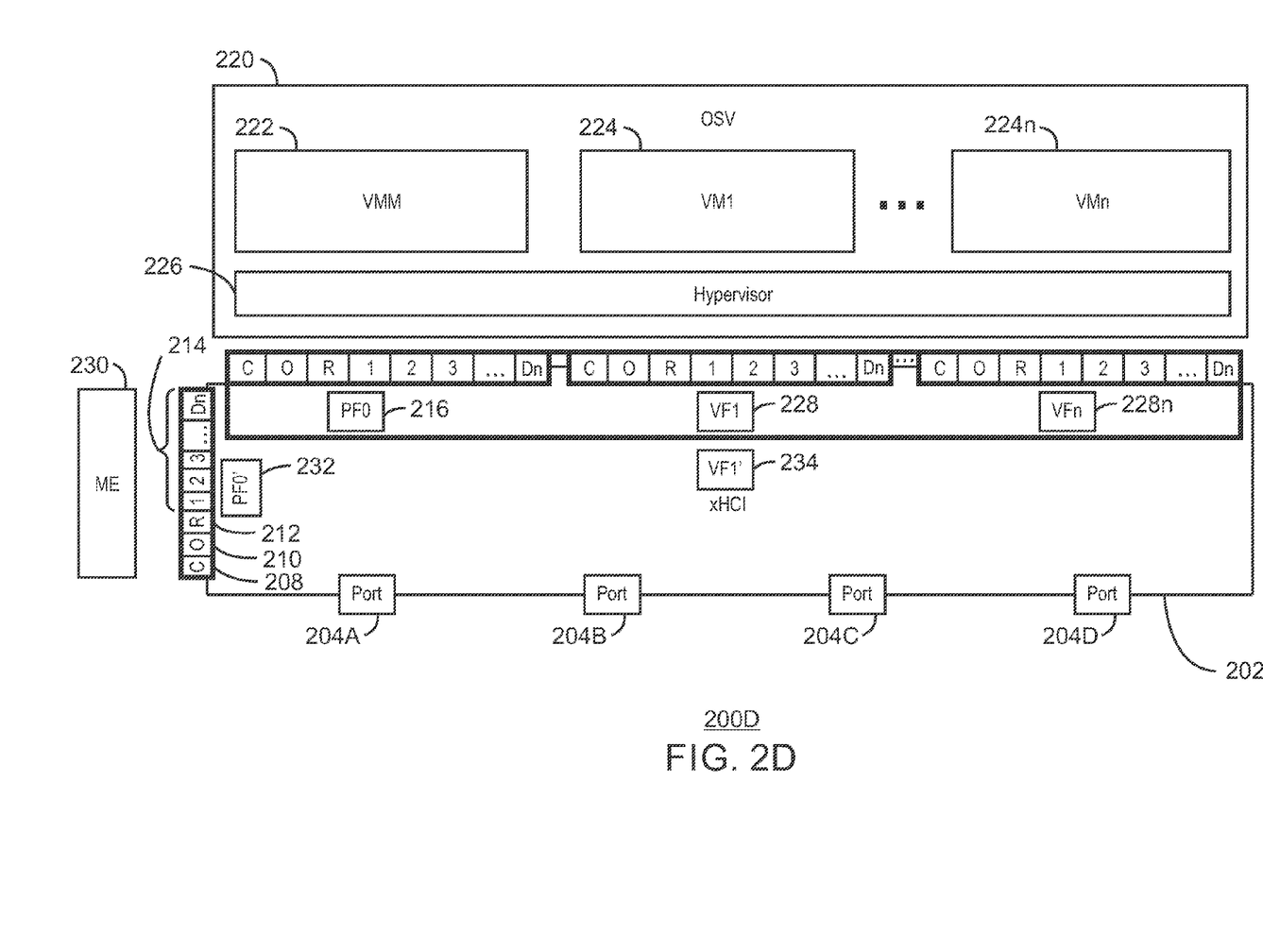
FIG. 2D is a block diagram of a system with a three tier virtualized xHCI interface.

FIG. 2D is a block diagram of a system 200D with a three tier virtualized xHCI interface. FIG. 2D includes an xHCI host controller 202 that is to control USB devices coupled with the system 200D via USB ports 204A, 204B, 204C, and 204D. FIG. 2D also includes an OSV 220 to create the VMM 222, which in turn can spawn any number of virtual machine (VM) instantiations VM1 224 to VMn 224n.

In FIG. 2D, the ME 230 owns the actual physical function (PF0') 232. The ME 230 uses PF0' 232 to manage a virtual function prime (VF1') instantiation 234, which represents a virtualized xHCI interface 200B to the OSV 220. This enables the ME 230 to represent a physical function 216 to the VMM 222. Accordingly, VF1' is observed as PF0 216 by the VMM 222. The VMM operates as a typical VMM, without distinguishing that resources under its control have been virtualized. Moreover, the VMM is to operate as though no further virtualization occurs beyond the virtualization created by the VMM. Thus, the VMM 222 continues further emulation of PF0 216, which is actually VF1' 234, to VMs 224 through 224n via the VF1 228 through VFn 228n.

Using the three tier virtualization illustrated by FIG. 2D, a USB device can be placed in a secure and isolated environment when under dedicated ownership by the ME 230. Depending on the security needs of the device as indicated by device descriptor, the ME 230 can have dedicated ownership of the device, pass ownership of the device to the VMM 222, or share ownership of the device with the VMM 222. The VMM 222 can retain ownership of the device, share ownership of the device with a VM, or pass ownership of the device to the VM.

In examples, a ME and SR-IOV enabled xHCI host controller is enhanced to support ME and SR-IOV hardware.

All hubs are permanently owned by the ME, which enables any new device attach or detach activity to be detected by the ME. After enumeration of a new device, including a new USB hub, the ME makes a policy decision to determine ownership of the device. A device may be fully owned by the ME and is never visible to level above the ME, VF1' 234. An example of such a device is a secure USB Finger Print Sensor. Additionally, a device may be owned by the ME but is also shared with the VMM. An example of such a device is a hub or a keyboard. The VMM will make similar policy decisions once a device is assigned to it. The VMM thus makes a policy decisions as to retain control of an assigned device fully, share the device assigned to it with a VM, or relinquish control completely to the VM.

In an exemplary use case, a user can take a picture to obtain biometric data for host login purposes. In this case, the camera is a USB device that will send sensitive biometric data to the host system. Dependent on the level of security desired, the device is owned by either the ME or the VMM in order to provide the appropriate level of security. The most secure ownership is under ME, as it is a fully closed environment. In embodiments, the ME firmware is applied to the host system such that it cannot be modified or deleted from the system without causing a boot failure. The VMM provides the lower level of security when compared to the ME, and a non-virtualized system enables the least amount of security for the USB device. The device descriptors are able to declare the appropriate level of security for the device.

As described above, the present techniques are to extend the virtualization capabilities of SR-IOV by creating an additional root physical function PF0'. The following table illustrates additional capabilities that support PF0':

TABLE 1

Physical Register Space

| | ME FW PF0' | VMM PF0 or Host OS | VM VFn |
|---|---|---|---|
| PCI Configuration Space | Yes | Yes | Trapped and Emulated by VMM |
| MMIO Address Space Capability and Operational Registers | Yes | Yes (populated by ME FW when PF0' is present) | Trapped and Emulated by VMM |
| Doorbell Array and runtime registers | Yes | Yes | Yes |
| Slot Assignment Register | Yes (assigns devices it does not own to PF0) | Yes (assigns devices it does not own to VFn) | No |
| Special Hub Treatment (Shared device) | Yes (handled by ME) | Yes (exposed as a virtual function) | |

Table 1 describes the general PCI physical register space for each of a ME with a root physical function (ME FW PF0'), a VMM or Host OS, and a VM supported by a virtual function (VM VFn). PCI devices are enabled by mapping their physical register space to base address registers (BARs). The ME and SR-IOV xHCI controller includes several spaces within its BAR space: a PCI configuration space, memory mapped input/output (MMIO) address space, and DRAM configuration address space. The PCI configuration space includes registers that are mapped to memory locations. The PCI configuration space is used to initialize the xHCI controller. The MMIO address space is a memory space that enables access to devices owned by the controller. The DRAM memory address space enables writes to the main memory.

In emulating the physical function, the ME and VMM each emulate the PCIe address space for each function. Each address space includes a capability register, an operational register, a runtime register, and doorbell registers. Each USB device is assigned a device slot, which is associated with a doorbell register in the MMIO space of the xHCI. When an action is to be performed by a USB device, a write to the doorbell informs the controller that a data transfer to or from an endpoint of a USB device is ready. In embodiments, doorbell 0 is reserved for the host controller, and can indicate actions at the host controller. The address of the doorbell identifies which USB device to communicate with. Additionally, the data in the doorbell register identifies the endpoint of the USB device that the action is targeted at, which translates into a respective xHCI DMA channel that will be used to move the data. When the doorbell is written to, this indicates that data is present at a transfer ring. The transfer ring enables data transfer using scatter-gather data transfers between host and device.

Figure 3:
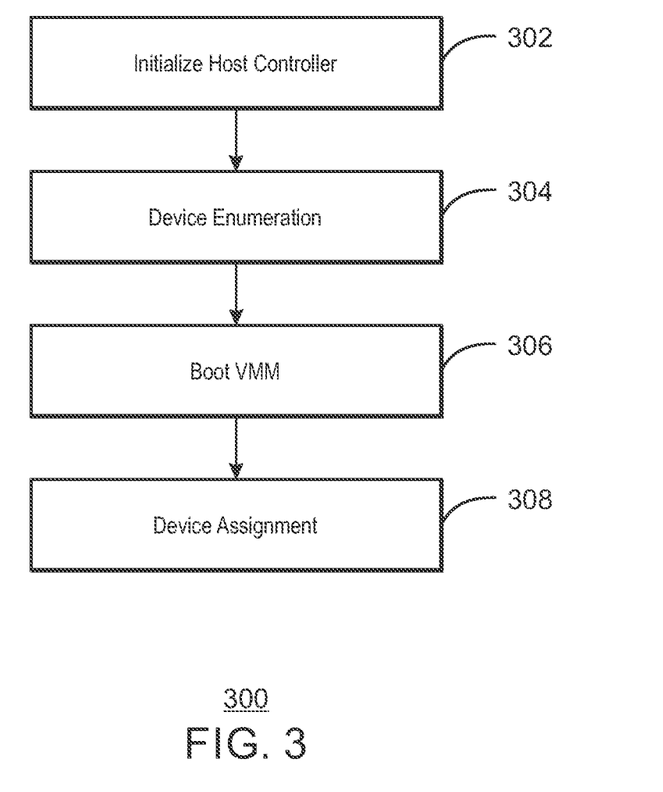
FIG. 3 is a process flow diagram of a method for a secured execution environment with SR-IOV and xHCI-IOV.

FIG. 3 is a process flow diagram of a method 300 for a secured execution environment with SR-IOV and xHCI-IOV. At block 302, the host controller is initialized. The host controller may be initialized using the PCIe configuration and MMIO address space. In embodiments, the host controller is an xHCI host controller that is initialized via the ME. Initially, all devices are owned by ME FW, and ME FW is also responsible for host controller PF0' register initialization. In this manner, the host controller knows it is owned by ME. The ME FW is also responsible for initialization values in PF0 register space in order to ensure the values represent values that are expected by a VMM upon its initialization. In embodiments, the host controller may have a register space assigned during initialization. The register space can also be allocated by the host controller. Further, the register space may be defined by the host controller.

At block 304, USB device enumeration occurs. The enumeration process recursively walks the USB topology searching for attached hubs and devices. As part of device enumeration process, the ME will initialize a root hub. All USB hubs are owned by ME FW, and the ME FW emulates instances of the USB Hubs to the VMM. A hub will indicate if a device is connected below it. If there is a device connected, the ME will begin device enumeration. This process continues until the entire USB topology has been examined.

Device enumeration also occurs in response to a hot-plug event, where a USB device is coupled with the system after initialization. An interrupt may be generated to enumerate the device upon a hot-plug event. The xHCI controller supports multiple interrupters. Associated with each interrupter is an event ring. As events are detected by the host controller they are posted to an event ring, which in turn will cause an interrupt to be generated. Interrupter 0' is owned by the ME. Interrupter 0 is owned by the VMM. Interrupters 1-n may be owned by the VMM or assigned to a by the VMM to a VM.

If a port change status detected on any of the root hub ports due to a hot-plug event, the xHCI host controller will post a port status change event to event ring 0'. The event ring 0' generates an interrupt directly for the ME. In response to the interrupt, the ME will enable access to the device attached to the port by issuing a slot enable command through the PF0' command ring. Further, the host controller will return the ID of the device slot to use to access the device. The ME will then use the control endpoint of the device slot to issue requests to the device and determine the type of the device and its features. At this point the ME can decide whether it wants to exclusively own the device, share the device with the PF0, or assign the device to PF0. Depending on the system architecture, PF0 can be owned by a VMM (FIG. 2D) or an OS (FIG. 2C).

At block 306, the VMM is booted. When VMM begins running it will access the host controller PF0 registers in its address space. In embodiments, the VMM will also enable SR-IOV and spawn new VMs as needed. The VMs (1-$n$) will initialize VF1-$n$ registers as appropriate. All VMM and VM commands to the xHCI Controller result in virtual "doorbell 0" requests for their respective functions (PF0 or VFn). These actions create an event for the virtualization level below, which is the ME. Since the ME is the owner of PF0' and physical doorbell 0, it is responsible for executing the VMM/VM requested action to the controller.

At block 308, the VMM walks the USB topology, looking for attached devices. The ME tracks this activity through its PF0' interface and assigns devices to the VMM. The ME can also tracks this activity through its PF0' interface and assign devices to the OS. In embodiments, a USB device can be assigned to the ME, the VMM, or a VM. With the slot ID, the ME will perform address assignment and read the device descriptor of the USB device.

The ME analyzes the device's descriptors and assigns the device to itself or to the PF0 using a policy decision. In examples, when the ME FW policy decides that the device is not to be assigned to the ME, it will assign the device to the VMM or OS. In turn, the VMM has its own policy which may determine that its ownership of the device is inappropriate, and assign the device to a VM. For example, consider a high speed camera with no sensitive data. The ME FW is to determine that there is no security needed for the camera and assign it to the VMM. In turn, the VMM can determine that it does not need control of the camera, which is then assigned to a VM.

In embodiments, if the device is fully assigned to PF0 then it is marked with a device disowned bit in the device slot assignment register by the ME FW. If the device is fully owned by the ME, then it is marked with device owned bit in the device slot assignment register by ME FW. If the device is to be shared, the ME FW requests a new device slot ID for each shared instance, and sets parameters for the slot indicating that it shall be used for emulation using direct memory access (DMA) assist. The xHCI controller then returns a new emulated device slot ID with DMA assist to ME. The ME FW would then mark the new device slot assignment register with two bits indicating the device is owned and it is shared. This enables the controller to recognize that the access to this slot ID requires emulation assist to PF0.

After the ME has completed assignment of device it would generate a force event command to transfer the event to PF0 to inform it that a USB device has been attached to PF0. As part of the event transfer, an xHCI controller hardware assist includes support for generating the event to the intended recipient and transfer the underlying event buffer to the event ring memory space of the intended recipient. After receiving the event, the intended recipient (e.g. VMM) would process the event and continue.

In embodiments, when the device is under full control of the VMM, the device operation is fully managed by VMM using the PF0 register space and associated memory space. The VMM may assign a device to a VM so that the device operation may be fully managed by the VM using the VF1-$n$ register space and associated memory space. Similarly, if the device is dedicated to the ME, the device operation is fully managed by ME using PF0' register space and associated memory space. When the device is shared, the transfer request blocks (TRBs) originate in the highest level (e.g. VF1) and are transferred to the level below using transfer events (e.g. VF1→PF0→PF0') until the actual desired action is taken by the xHCI controller hardware. Similarly, responses from the xHCI hardware controller are transferred to the lowest level first (PF0') and passed up to the level above using transfer events (e.g. PF0'→PF0→VF1).

Accordingly, an ME and SR-IOV, and xHCI-IOV xHCI controller enables device configuration by the ME to appear in the PCI configuration space as multiple physical functions. The physical functions are associated with physical functions managed by the VMM according to SR-IOV and xHCI-IOV. The VMM spawns multiple VMs, each with assigned virtual functions that appear in the PCI configuration space. Each virtual function can support a unique and separate data path for I/O-related functions.

Figure 4:
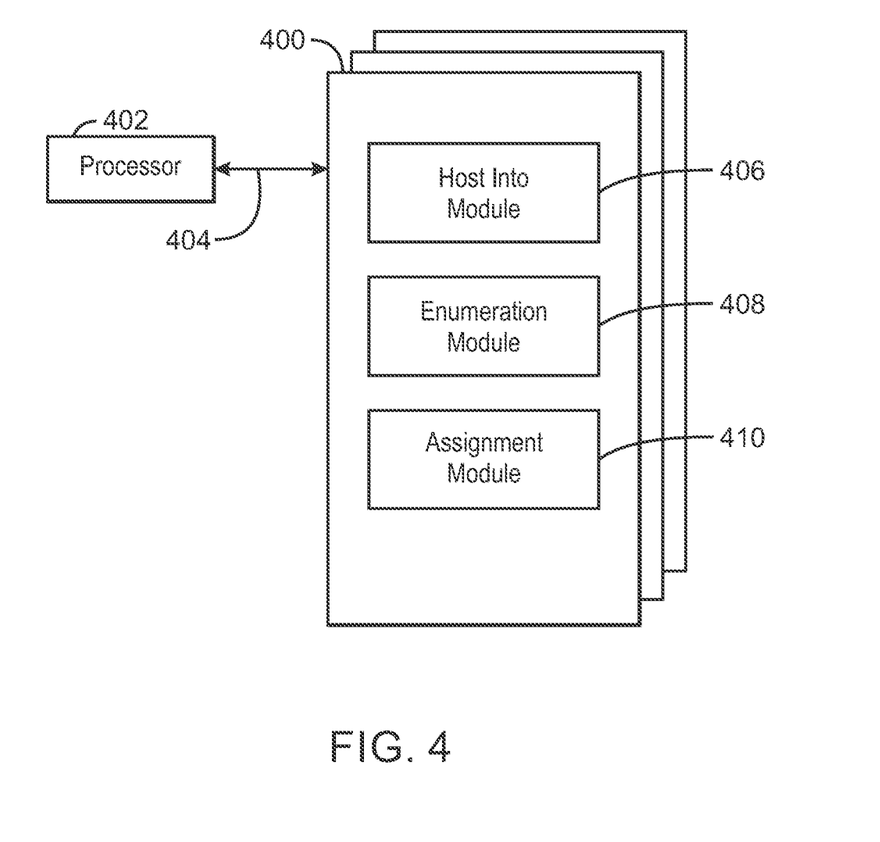
FIG. 4 is a block diagram showing tangible, non-transitory computer-readable media that stores code for a secured execution environment with SR-IOV.

FIG. 4 is a block diagram showing tangible, non-transitory computer-readable media 400 that stores code for a secure execution environment with SR-IOV. The tangible, non-transitory computer-readable media 400 may be accessed by a processor 402 over a computer bus 404. Furthermore, the tangible, non-transitory computer-readable medium 400 may include code configured to direct the processor 402 to perform the methods described herein.

The various software components discussed herein may be stored on one or more tangible, non-transitory computer-readable media 400, as indicated in FIG. 4. For example, a host initialization module 406 may be configured to initialize the host controller. In embodiments, the host controller is initialized by ME FW. The host initialization module may also cause the VMM to boot. An enumeration module 408 may be configured enumerate to devices. Prior to the enumeration of the devices, each hub may be initialized. At block 410, an assignment module is to assign each device to ownership by the ME FW, the VMM, or the host OS. In embodiments, the device ownership can be dedicated ownership or shared ownership.

The block diagram of FIG. 4 is not intended to indicate that the tangible, non-transitory computer-readable media 400 is to include all of the components shown in FIG. 4. Further, the tangible, non-transitory computer-readable media 400 may include any number of additional components not shown in FIG. 4, depending on the details of the specific implementation.

Example 1

An apparatus is described herein. The apparatus includes a Universal Serial Bus (USB) device and a controller interface. The controller interface is to allocate register space for interfacing with the USB device and the USB device is virtualized into multiple instantiations. The apparatus also includes a secure environment, wherein the secure environment is to virtualize the multiple instantiation by emulating a register space for the multiple instantiations.

The controller interface may be an eXtensible host controller interface (xHCI). Additionally, the USB hub may be virtualized into multiple instantiations using a combination of a combination of Single Root Input/Output Virtualization (SR-IOV) and xHCI-Input/Output Virtualization (xHCI- IOV). The secure environment may be a management engine. The USB device may be a plurality of USB devices, a plurality of USB hubs, or any combination thereof. At least one USB device may be owned by the secure environment, and the secure environment may be enabled by a dedicated processor or microcontroller. The USB hub may be virtualized into multiple instantiations via a physical function and an associated virtual function. The secure environment can virtualize the multiple instantiations via a root physical function linked to the physical function. Additionally, the controller interface may support Low-, Full-, High-, Super-Speed, and SuperSpeedPlus USB devices.

Example 2

An apparatus is described herein. The apparatus includes a Universal Serial Bus (USB) device and a controller interface. The controller interface is to define a register space for interfacing with the USB device and is managed by an operating system. The apparatus also includes a management engine, wherein the management engine virtualizes the register space such that the USB device is owned by the management engine and emulated to the operating system.

The controller interface may be an eXtensible host controller interface. The management engine may own a physical function zero prime (PF0') that emulates a virtual function one prime (VF1') to the operating system. The USB device can be a plurality of USB devices, a plurality of USB hubs, or any combination thereof. At least one USB device may be owned by the secure environment. The management engine may be a secure environment enabled by a dedicated processor or microcontroller. The controller interface may support Low-, Full-, High-, SuperSpeed, and SuperSpeedPlus USB devices.

Example 3

A system is described herein. The system includes a USB hub coupled with a plurality of USB devices and a microcontroller. The microcontroller is to interface with the USB hub. The system also includes a virtual machine manager that is to virtualize an address space of the USB hub into multiple instantiations, and at least one policy manager that is to further virtualize the multiple instantiations such that the multiple instantiations are owned by the policy manager.

The microcontroller may be compliant with an eXtensible host controller interface. The USB hub may be virtualized into multiple instantiations using a combination of Single Root Input/Output Virtualization (SR-IOV) and xHCI-Input/Output Virtualization (xHCI-IOV). The policy manager can be a management engine, and at least one USB device may be owned by the virtual machine manager. At least one USB device may be owned by the policy manager. The policy manager may be a separate compute environment. The address space may be virtualized into multiple instantiations via a physical function and an associated virtual function. The policy manager may virtualize the multiple instantiations via a root physical function linked to the physical function. The policy manager may supports Low-, Full-, High-, SuperSpeed, and SuperSpeedPlus USB devices.

Example 4

A method is described herein. The method includes initializing a host controller via a management engine and booting a virtual machine manager. The method also includes enumerating a USB hub and a USB device and assigning the USB hub and the USB device to the management engine, the virtual machine manager, or any combination thereof.

The host controller may be compliant with an eXtensible host controller interface. The USB hub and the USB device may be assigned to the management engine during initialization. The management engine may initialize values in a physical function address space for the virtual machine manager. The USB device may be assigned to the management engine, the virtual machine manager, or any combination thereof based on a device descriptor. At least one USB hub may be shared by the management engine and the virtual machine manager. The USB hub and the USB device may be enumerated by recursively walking a USB topology and searching for attached hubs and devices. The USB hub and the USB device may be enumerated in response to a hot plug event. Additionally, the USB hub and the USB device may be assigned to the management engine, the virtual machine manager, or any combination thereof based on device descriptors. The management engine can analyze the device descriptors and assigns the USB hub or the USB device via a policy. Further, the virtual machine manager can assign the USB hub or the USB device to a virtual machine via a policy. The management engine and the virtual machine manager may share ownership of the USB hub or the USB device. A transfer event may transfer data between a root physical function zero prime (PF0') corresponding to the management engine and the physical function zero (PF0) corresponding to the virtual machine manager.

Example 5

An apparatus is described herein. The apparatus includes a Universal Serial Bus (USB) device and a controller interface. The controller interface is to allocate register space for interfacing with the USB device and the USB device is virtualized into multiple instantiations. The apparatus also includes a means to virtualize the multiple instantiations by emulating a register space for the multiple instantiations.

The controller interface may be an eXtensible host controller interface (xHCI). The USB device may be virtualized into multiple instantiations using a combination of a combination of Single Root Input/Output Virtualization (SR-IOV) and xHCI-Input/Output Virtualization (xHCI-IOV). The means to virtualize the multiple instantiations may be a management engine. The USB device may be a plurality of USB devices, a plurality of USB hubs, or any combination thereof. At least one USB device can be owned by the means to virtualize the multiple instantiations. The means to virtualize the multiple instantiations may be enabled by a dedicated processor or microcontroller. The USB hub can be virtualized into multiple instantiations via a physical function and an associated virtual function. The means to virtualize the multiple instantiations may virtualize the multiple instantiations via a root physical function linked to the physical function. The controller interface may support Low-, Full-, High-, SuperSpeed, and SuperSpeedPlus USB devices.

Example 6

A tangible, non-transitory, computer-readable medium is described herein. The computer-readable medium comprises code to direct a processor to initialize a host controller via a management engine and boot a virtual machine manager. The computer-readable medium also comprises code to direct a processor to enumerate a USB hub and a USB device and assign the USB hub and the USB device to the management engine, the virtual machine manager, or any combination thereof.

The host controller may be compliant with an eXtensible host controller interface. The USB hub and the USB device may be assigned to the management engine during initialization. The management engine may initialize values in a physical function address space for the virtual machine manager. The USB device may be assigned to the management engine, the virtual machine manager, or any combination thereof based on a device descriptor. At least one USB hub may be shared by the management engine and the virtual machine manager. The USB hub and the USB device may be enumerated by recursively walking a USB topology and searching for attached hubs and devices. The USB hub and the USB device may be enumerated in response to a hot plug event. The USB hub and the USB device can be assigned to the management engine, the virtual machine manager, or any combination thereof based on device descriptors. The management engine may analyze the device descriptors and assigns the USB hub or the USB device via a policy. Additionally, the virtual machine manager may assign the USB hub or the USB device to a virtual machine via a policy. The management engine and the virtual machine manager can share ownership of the USB hub or the USB device. A transfer event may transfer data between a root physical function zero prime (PF0') corresponding to the management engine and the physical function zero (PF0) corresponding to the virtual machine manager.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus, comprising:
   a Universal Serial Bus (USB) device;
   a controller interface, wherein the controller interface is an eXtensible host controller interface (xHCI) and is to allocate register space for interfacing with the USB device and the USB device is virtualized into multiple instantiations; and
   a secure environment, wherein the secure environment is to virtualize the multiple instantiations by emulating a register space for the multiple instantiations and a USB hub is virtualized into multiple instantiations using a combination of a combination of Single Root Input/Output Virtualization (SR-IOV) and xHCI-Input/Output Virtualization (xHCI-IOV) via the controller interface.

2. The apparatus of claim 1, wherein the secure environment is a management engine.

3. The apparatus of claim 1, comprising a plurality of USB devices, wherein the controller interface is to allocate register space for interfacing with the plurality of USB devices.

4. The apparatus of claim 3, wherein at least one USB device of the plurality of USB devices is owned by the secure environment.

5. The apparatus of claim 1, wherein the secure environment is enabled by a dedicated processor or microcontroller.

6. The apparatus of claim 1, wherein the USB hub is virtualized into multiple instantiations via a physical function and an associated virtual function.

* * * * *